No. 610,114. Patented Aug. 30, 1898.
J. R. WEATHERLY.
STALK CUTTER.
(Application filed Mar. 11, 1898.)
(No Model.)
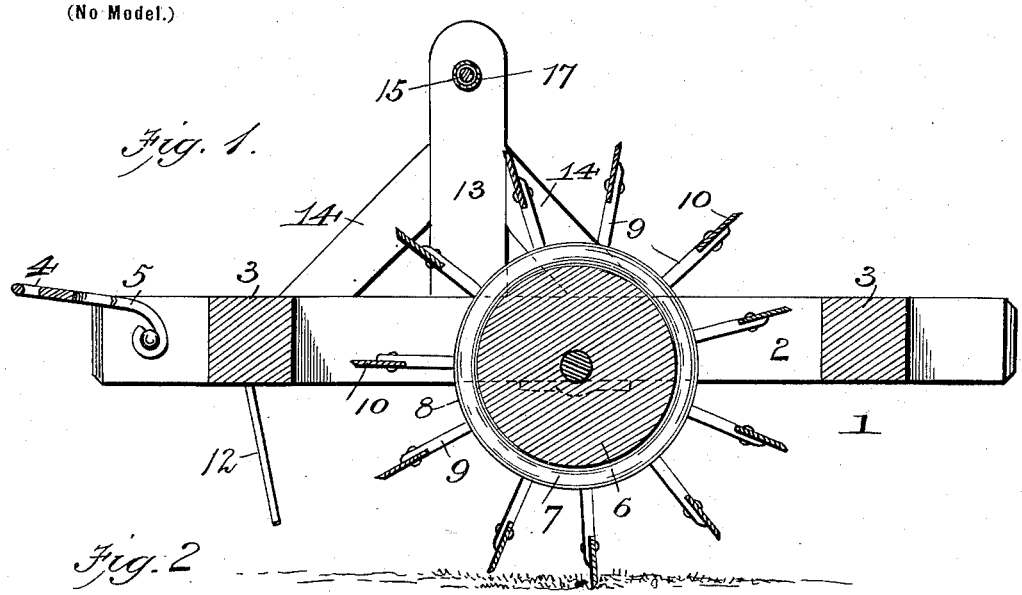
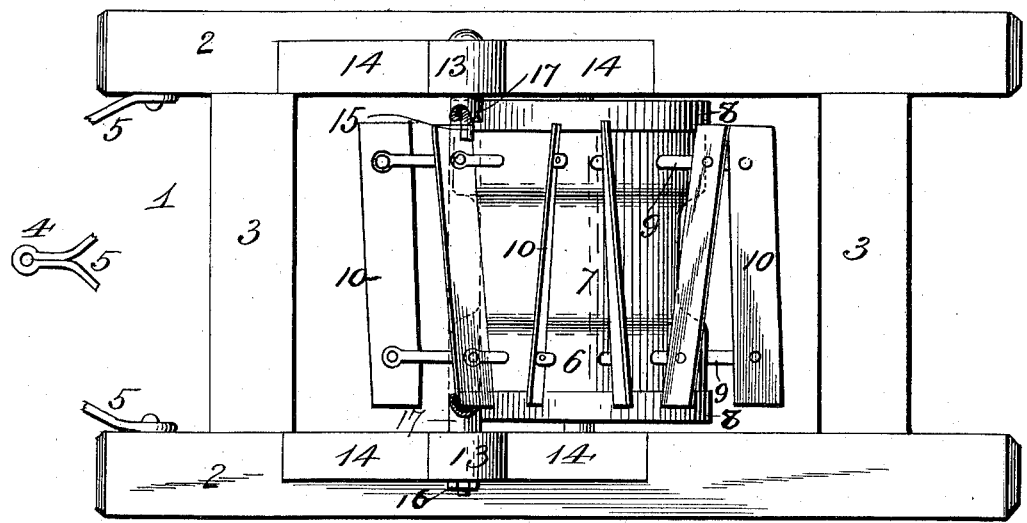
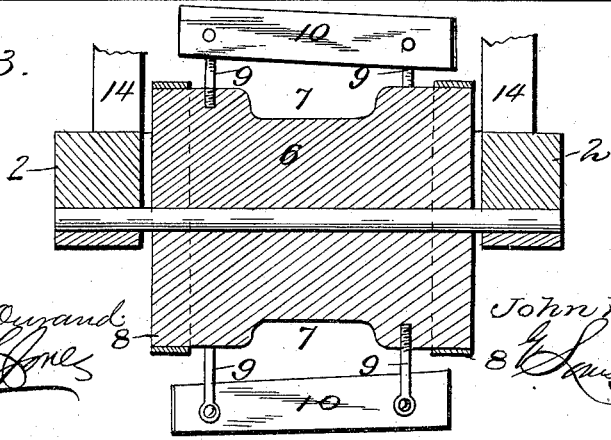
Witnesses
Franck L. Ouzand
James H. Jones
Inventor:
John R. Weatherly
by Sans Sagger & Co
Attorneys
THE NORRIS PETERS CO., PHOTO-LITHO., WASHINGTON, D. C.

UNITED STATES PATENT OFFICE.

JOHN R. WEATHERLY, OF SUMTER, SOUTH CAROLINA.

STALK-CUTTER.

SPECIFICATION forming part of Letters Patent No. 610,114, dated August 30, 1898.

Application filed March 11, 1898. Serial No. 673,521. (No model.)

*To all whom it may concern:*

Be it known that I, JOHN R. WEATHERLY, a citizen of the United States, residing at Sumter, in the county of Sumter and State of South Carolina, have invented new and useful Improvements in Stalk-Cutters, of which the following is a specification.

My invention relates to stalk-cutters of that class or description which are connected with an ordinary farm-wagon and drawn across the field to cut the stalks in order that they may be readily plowed in.

The object of the present invention is to provide improved means whereby I secure important advantages with respect to efficiency in use.

The invention consists in the novel construction and combination of parts hereinafter fully described and claimed.

In the accompanying drawings, Figure 1 is a central longitudinal sectional view of a stalk-cutter constructed in accordance with my invention. Fig. 2 is a plan view of the same. Fig. 3 is a transverse sectional view taken centrally through the rotatable cylinder.

In the said drawings the reference-numeral 1 designates the frame of the cutter, comprising the longitudinal side bars 2 and transverse end bars 3. Pivotally connected with the front ends of the bars 2 is a bail or yoke consisting of a metal rod bent over at the center, forming an eye 4 and the rearwardly-extending arms 5. The eye 4 is adapted to engage with a hook or fastening on the tongue of an ordinary wagon at a point about in line with the doubletree.

Journaled in bars 2 is a rotatable drum or cylinder 6, formed with a central peripheral groove or recess 7 and end flanges 8. Secured to said flanges are a number of radial arms 9, to which are secured knives or cutters 10. These knives are inclined alternately in opposite directions with respect to the axial line of the drum or cylinder and are also alternately inclined from end to end in opposite directions, so that the end of one knife will be farther from the center of the drum or cylinder than the adjacent end of the next knife. The object of this construction is to cause the edge of each knife to strike squarely on the ground during operation. The object of inclining the knives, as first stated, is to form alternately-tapering spaces between the same to prevent clogging and also to give a diagonal cut to the knives, which will render them more efficient. The central recess in the drum is to allow any dirt or stalks to fall to the ground which might otherwise be carried around with the drum in its rotation. The numeral 12 designates outwardly-inclined teeth in front of the drum to draw the stalks into lines.

The numeral 13 designates two standards secured to the side bars 2, braced by inclined bars 14. Passing through the upper ends of these standards is a rod 15, provided with a tightening-nut 16.

The numeral 17 designates a rotatable tube through which said rod passes and on which the reach or coupling-pole of the wagon rests. This tube is located somewhat in advance of the drum, so that the proper pressure will be brought upon the knives, and the tube being rotatable reduces friction between it and the reach.

From the above it will be seen that the knives incline alternately in opposite directions with respect to the longitudinal axial line of the drum and also with respect to the vertical axis of the drum—that is to say, the end of one knife in the latter case is farther from the center of the drum than the adjacent end of the next knife. If the knives were at the same distance from the center of the drum at all points, then in operation one end of the knife would strike the ground in advance of the other end, and thus give a jerky or wabbling movement to the machine; but by inclining them, as described, all points of the edge of the knife will strike the ground simultaneously, but at an angle to the line of draft of the machine, so that they will make a diagonal cut.

Having thus fully described my invention, what I claim is—

1. In a stalk-cutter, the combination with the frame and means for connecting it with a wagon-tongue, of the rotatable drum formed with a central peripheral recess, the arms secured to said drum near each end but in different planes and the knives inclined alternately in opposite directions, substantially as described.

2. In a stalk-cutter, the combination with the frame, the pivoted bail or yoke at the front end thereof adapted to be connected with a wagon-tongue, the standards, the rod passing therethrough provided with a tightening-nut, and the rotatable tube on said rod, of the rotatable drum or cylinder having a central peripheral depression, the arms near the ends of said drum located in different longitudinal planes and of alternately-different lengths, the knives or cutters inclined alternately in opposite directions with respect to the longitudinal and vertical axes of the drum, and the inclined teeth in the front of said drum, substantially as described.

In testimony whereof I have hereunto set my hand in presence of the subscribing witnesses.

JOHN R. WEATHERLY.

Witnesses:
H. D. BARNETT,
A. W. WEATHERLY,
W. W. DICK.